United States Patent
Fridella et al.

(10) Patent No.: US 7,315,926 B2
(45) Date of Patent: Jan. 1, 2008

(54) LOCK MANAGEMENT FOR CONCURRENT ACCESS TO A SINGLE FILE FROM MULTIPLE DATA MOVER COMPUTERS

(75) Inventors: Stephen A. Fridella, Newton, MA (US); Xiaoye Jiang, Shrewsbury, MA (US); Uday K. Gupta, Westford, MA (US); Sorin Faibish, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 514 days.

(21) Appl. No.: 10/945,654

(22) Filed: Sep. 21, 2004

(65) Prior Publication Data

US 2006/0064554 A1    Mar. 23, 2006

(51) Int. Cl.
*G06F 13/00* (2006.01)
*G06F 12/00* (2006.01)
(52) U.S. Cl. .................. 711/163; 711/151; 711/152; 711/154
(58) Field of Classification Search ........ 711/100, 711/150, 151, 152, 154
See application file for complete search history.

(56) References Cited

U.S. PATENT DOCUMENTS

| | | | |
|---|---|---|---|
| 5,175,852 A | 12/1992 | Johnson et al. ............ 707/8 |
| 5,226,143 A | 7/1993 | Baird et al. ............. 711/145 |
| 5,226,159 A | 7/1993 | Henson et al. ............ 707/8 |
| 5,594,863 A | 1/1997 | Stiles .................... 714/15 |
| 5,737,747 A | 4/1998 | Vishlitzky et al. ........ 711/118 |
| 5,892,915 A * | 4/1999 | Duso et al. ............. 709/219 |
| 5,893,140 A | 4/1999 | Vahalia et al. .......... 711/118 |
| 5,933,603 A * | 8/1999 | Vahalia et al. .......... 709/225 |
| 5,950,203 A | 9/1999 | Stakuis et al. .......... 707/10 |
| 5,953,012 A * | 9/1999 | Veghte et al. .......... 715/781 |
| 5,987,477 A | 11/1999 | Schmuck et al. ........ 707/10 |
| 6,023,706 A | 2/2000 | Schmuck et al. ........ 707/200 |
| 6,032,216 A | 2/2000 | Schmuck et al. ........ 710/200 |
| 6,173,293 B1 | 1/2001 | Thekkath et al. ........ 707/201 |
| 6,324,581 B1 | 11/2001 | Xu et al. ................ 709/229 |
| 6,389,420 B1 | 5/2002 | Vahalia et al. ............ 707/8 |
| 7,184,439 B1 * | 2/2007 | Aubuchon et al. ....... 370/395.1 |

OTHER PUBLICATIONS

B. Callaghan, et al., NFS Version 3 Protocol Specification, RFC 1813, Sun Microsystems, Inc., Jun. 1995, 126 pages.

(Continued)

*Primary Examiner*—Tuan V. Thai
(74) *Attorney, Agent, or Firm*—Richard C. Auchterlonie; Novak Druce & Quigg, LLP (57) ABSTRACT

A protocol is provided for allocating file locking tasks between primary and secondary data mover computers in a network file server. When there is frequent read access and infrequent write access to a file, a primary data mover grants read locks to the entire file to secondary data movers, and the secondary data movers grant read locks to clients requesting read access. When write access to the file is needed, the read locks to the entire file are released and the read locks granted to the clients are released or expire or are demoted to non-conflicting byte range locks managed by the primary data mover. Concurrent read and write access to the same file is then managed by the primary data mover.

15 Claims, 4 Drawing Sheets

OTHER PUBLICATIONS

S. Shepler, et al., NFS Version 4 Protocol Specification, RFC 3530, Sun Microsystems, Inc., Apr. 2003, 275 pages.

EMC Celerra File Server—Reach new heights of availability and scalability with EMC Celerra File Server, brochure, EMC Corporation, Hopkinton, MA, 2002, 6 pages.

"*EMC Clariion Enterprise Storage Systems Product Description Guide*", EMC Corporation, Hopkinton, MA, 2002, 39 pages.

Mullick et al., U.S. Appl. No. 10/668,467, filed Sep. 23, 2003, entitled "Multi-threaded Write Interface and Methods for Increasing the Single File Read and Write Throughput."

* cited by examiner

LOCK MANAGEMENT FOR CONCURRENT ACCESS TO A SINGLE FILE FROM MULTIPLE DATA MOVER COMPUTERS

FIELD OF THE INVENTION

The present invention relates generally to a network file server having a plurality of data mover computers that share access to storage and service client requests for concurrent access to the same file.

BACKGROUND OF THE INVENTION

A network file server typically includes a digital computer for servicing storage access requests in accordance with at least one network file access protocol, and an array of disk drives. The computer has been called by various names, such as a storage controller, a data mover, or a file server. The computer typically performs client authentication, enforces client access rights to particular storage volumes, directories, or files, and maps directory and file names to allocated logical blocks of storage.

Data consistency problems may arise if multiple clients or processes have concurrent access to read-write files. Typically write synchronization and file locking have been used to ensure data consistency. For example, the data write path for a file has been serialized by holding an exclusive lock on the file for the entire duration of creating a list of data buffers to be written to disk, allocating the actual on-disk storage, and writing to storage synchronously. Unfortunately, these methods involve considerable access delays due to contention for locks not only on the files but also on the file directories and a log used when committing data to storage. In order to reduce these delays, a file server may permit asynchronous writes in accordance with version 3 of the Network File System (NFS) protocol. See, for example, Vahalia et al. U.S. Pat. No. 5,893,140 issued Apr. 6, 1999, entitled "File Server Having a File System Cache and Protocol for Truly Safe Asynchronous Writes," incorporated herein by reference. More recently, byte range locking to a file has been proposed in version 4 of the NFS protocol. (See NFS Version 3 Protocol Specification, RFC 1813, Sun Microsystems, Inc., June 1995, incorporated herein by reference, and NFS Version 4 Protocol Specification, RFC 3530, Sun Microsystems, Inc., April 2003, incorporated herein by reference.)

In a network environment, it is often desirable to provide multiple data movers for providing client access to the network storage so that clients may access the same file from any of the data movers. To ensure data consistency in this situation, a respective one of the data movers is designated as the exclusive owner of each file for the purpose of granting read-write access to the file. If a data mover receives a client request for read-write access to a file that the data mover does not own, then the data mover forwards the request to the data mover that owns the file. In this situation, the data mover owning the file is said to be primary with respect to the file, and the data mover having initially received the request from the client is said to be secondary with respect to the file. Protocols for file access in this situation are further described in Xu et al., U.S. Pat. No. 6,324,581 issued Nov. 27, 2001, incorporated herein by reference.

SUMMARY OF THE INVENTION

It has been discovered that there can be a performance advantage for write lock management tasks to be allocated between primary and secondary data movers in a fashion different from the allocation of read lock management tasks. For managing read locks, it is often desirable for a primary data mover to grant a read lock upon an entire file to a secondary data mover, and for the secondary data mover to grant read locks upon this file to clients. For managing write locks, it is usually desirable for only the primary data mover to grant byte range locks to clients.

In accordance with one aspect, the invention provides a method of sharing read access and write access to storage of a network file server in which a plurality of data mover computers share access to the storage and service file access requests from network clients. The data mover computers include a primary one of the data mover computers having primary responsibility for control of access to the file and a secondary one of the data mover computers having secondary responsibility for control of access to the file. The method includes the secondary data mover computer receiving a request from a first network client for read access to the file, and then the secondary data mover computer responding to the request from the first network client for read access to the file by requesting a read lock on the entire file from the primary data mover computer, and then the secondary data mover computer receiving from the primary data mover computer a read lock on the entire file, and then the secondary data mover computer responding to the receipt of the read lock on the entire file by granting read access to the file to the first network client. The method further includes the secondary data mover computer receiving a request from a second network client for write access to a specified byte range in the file; and then the secondary data mover computer responding to receipt of the request from the second network client for write access to the specified byte range in the file by releasing the read lock on the entire file and sending to the primary data mover computer a request for write access of the client to the specified byte range in the file; and then the secondary data mover computer receiving from the primary data mover computer an acknowledgement of a grant of write access of the client to the specified byte range in the file; and then the secondary data mover computer returning to the client the acknowledgement of the grant of write access of the client to the specified byte range in the file.

In accordance with another aspect, the invention provides a method of sharing read access and write access to a file in storage of a network file server in which a plurality of data mover computers share access to the storage and service file access requests from network clients. The data mover computers include a primary one of the data mover computers having primary responsibility for control of access to the file and a secondary one of the data mover computers having secondary responsibility for control of access to the file. The method includes the secondary data mover computer holding a read lock on the entire file, and while holding the read lock on the entire file, the secondary data mover computer granting concurrent client read access to the file without notification to the primary data mover computer. In response to a request from a client for write access to a specified byte range of the file, the secondary data mover computer releases the read lock on the entire file, and upon termination of the concurrent client read access to the file without notification to the primary data mover computer, the secondary data mover computer notifies the primary data mover computer of the release of the read lock on the entire file. In response to the notification of the release of the read lock on the entire file, the primary data mover computer grants the client write access to the specified byte range of the file, and concurrent with the write access to the specified byte range of the file, the primary data mover computer grants to at least some of the network clients read access to byte ranges of the file.

In accordance with yet another aspect, the invention provides a network file server including storage and a plurality of data mover computers coupled to the storage for sharing access to the storage. The data mover computers are programmed to service file access requests from network clients. A primary one of the data mover computers is programmed to have primary responsibility for control of access to a file in the storage, and a secondary one of the data mover computers is programmed to have secondary responsibility for control of access to the file. The secondary data mover computer is programmed for holding a read lock on the entire file, and while holding the read lock on the entire file, granting concurrent client read access to the file without notification to the primary data mover computer. The secondary data mover computer is programmed to respond to a request from a client for write access to a specified byte range of the file by releasing the read lock on the entire file, and upon termination of the concurrent client read access to the file without notification to the primary data mover computer, notifying the primary data mover computer of the release of the read lock on the entire file. The primary data mover computer is programmed to respond to the notification of the release of the read lock on the entire file by granting the client write access to the specified byte range of the file, and concurrent with the write access to the specified byte range of the file, granting to at least some of the network clients read access to byte ranges of the file.

In accordance with still another aspect, the present invention provides a network file server including storage and a plurality of data mover computers coupled to the storage to share access to storage. The data mover computers are programmed to service file access requests from network clients. A primary one of the data mover computers is programmed to have primary responsibility for control of access to a file in the storage, and a secondary one of the data mover computers is programmed to have secondary responsibility for control of access to the file. The primary data mover computer is programmed to respond to a client request for access to a specified byte range of the file by checking whether access to the specified byte range of the file by the client conflicts with a lock already on the file, and upon finding that access to the specified byte range of the file does not conflict with a lock already on the file, granting to the client access to the specified byte range of the file, and upon finding that access to the specified byte range of the file does conflict with a lock already on the file, placing the request on a wait list until the conflicting lock is released, and upon finding that the client is requesting write access to the file, checking whether the secondary data mover computer holds a read lock on the entire file, and upon finding that the secondary data mover computer holds a read lock on the entire file, requesting the secondary data mover computer to release the read lock on the entire file. The secondary data mover computer is programmed to respond to client requests for read access to the file by obtaining from the primary data mover computer a read lock on the entire file, and upon obtaining a read lock on the entire file from the primary data move computer, granting concurrent client read access to the file, and upon receiving a request from the primary data mover computer for release of the read lock on the entire file, the secondary data mover computer releasing the read lock on the entire file and notifying the primary data mover computer of the release of the read lock on the entire file.

BRIEF DESCRIPTION OF THE DRAWINGS

Additional features and advantages of the invention will be described below with reference to the drawings, in which.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

Figure 1:
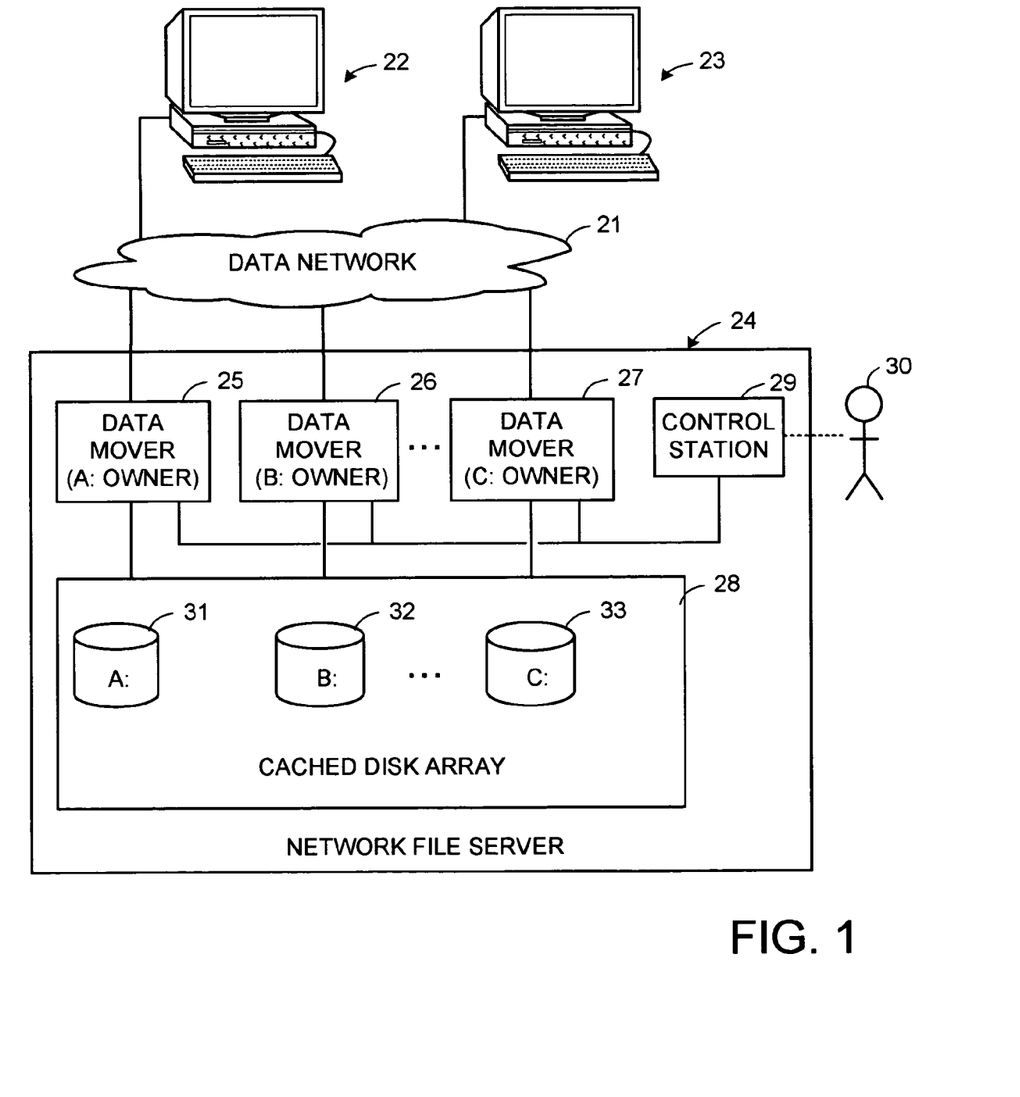
FIG. 1 is a block diagram of a data network including a network file server programmed for byte range locking of files in accordance with the present invention.

With reference to FIG. 1, there is shown a data processing system incorporating the present invention. The data processing system includes a data network 21 interconnecting a number of clients 22, 23 and servers such as a network file server 24. The data network 21 may include any one or more of network connection technologies, such as Ethernet, and communication protocols, such as TCP/IP. The clients 22, 23, for example, are workstations such as personal computers using either UNIX or Microsoft Windows operating systems. Various aspects of the network file server 24 are further described in Vahalia et al., U.S. Pat. No. 5,893,140 issued Apr. 6, 1999, incorporated herein by reference, and Xu et al., U.S. Pat. No. 6,324,581, issued Nov. 27, 2002, incorporated herein by reference. Such a network file server is manufactured and sold by EMC Corporation, 176 South Street, Hopkinton, Mass. 01748.

The network file server 24 includes a cached disk array 28 and a number of data mover computers, for example 25, 26, 27, and more. The network file server 24 is managed as a dedicated network appliance, integrated with popular network file systems in a way, which, other than its superior performance, is transparent to the end user. The clustering of the data movers 25, 26, 27 as a front end to the cache disk array 28 provides parallelism and scalability. Each of the data movers 25, 26, 27 is a high-end commodity computer, providing the highest performance appropriate for a data mover at the lowest cost. The network file server 24 also has a control station 29 enabling a system administrator 30 to configure and control the file server.

In the network environment of FIG. 1, is usually desirable to permit any of the clients 22, 23 to access the same file in storage of the cached disk array from any of the data movers 25, 26, 27. To ensure data consistency in this situation, a respective one of the data movers is designated as the exclusive owner of each file for the purpose of granting read-write access to the file. For example, files in the storage of the cached disk array 28 are organized into disjoint file systems such as the file system 31 named "A:" and owned by the data mover 25, the file system 32 named "B:" and owned by the data mover 26, and the file system 33 named "C:" and owned by the data mover 27. If a data mover receives a client request for read-write access to a file that the data mover does not own, then the data mover forwards the request to the data mover that owns the file. In this situation, the data mover containing the file is said to be primary with respect to the file, and the data mover having initially received the request from the client is said to be secondary with respect to the file. Protocols for file access in this situation are further described in Xu et al., U.S. Pat. No. 6,324,581 issued Nov. 27, 2001, incorporated herein by reference.

It has been discovered that there can be a performance advantage for write lock management tasks to be allocated between primary and secondary data movers in a fashion different from the allocation of read lock management tasks. For managing read locks, it is often desirable for a primary data mover to grant a read lock upon an entire file to a secondary data mover, and for the secondary data mover to grant read locks upon this file to clients. For managing write locks, it is usually desirable for only the primary data mover to grant byte range locks to clients. This performance advantage is especially significant for an application in which there are often long intervals of frequent client read activity and infrequent write activity. This occurs, for example, in many business database systems that are updated infrequently during normal business hours.

Figure 2:
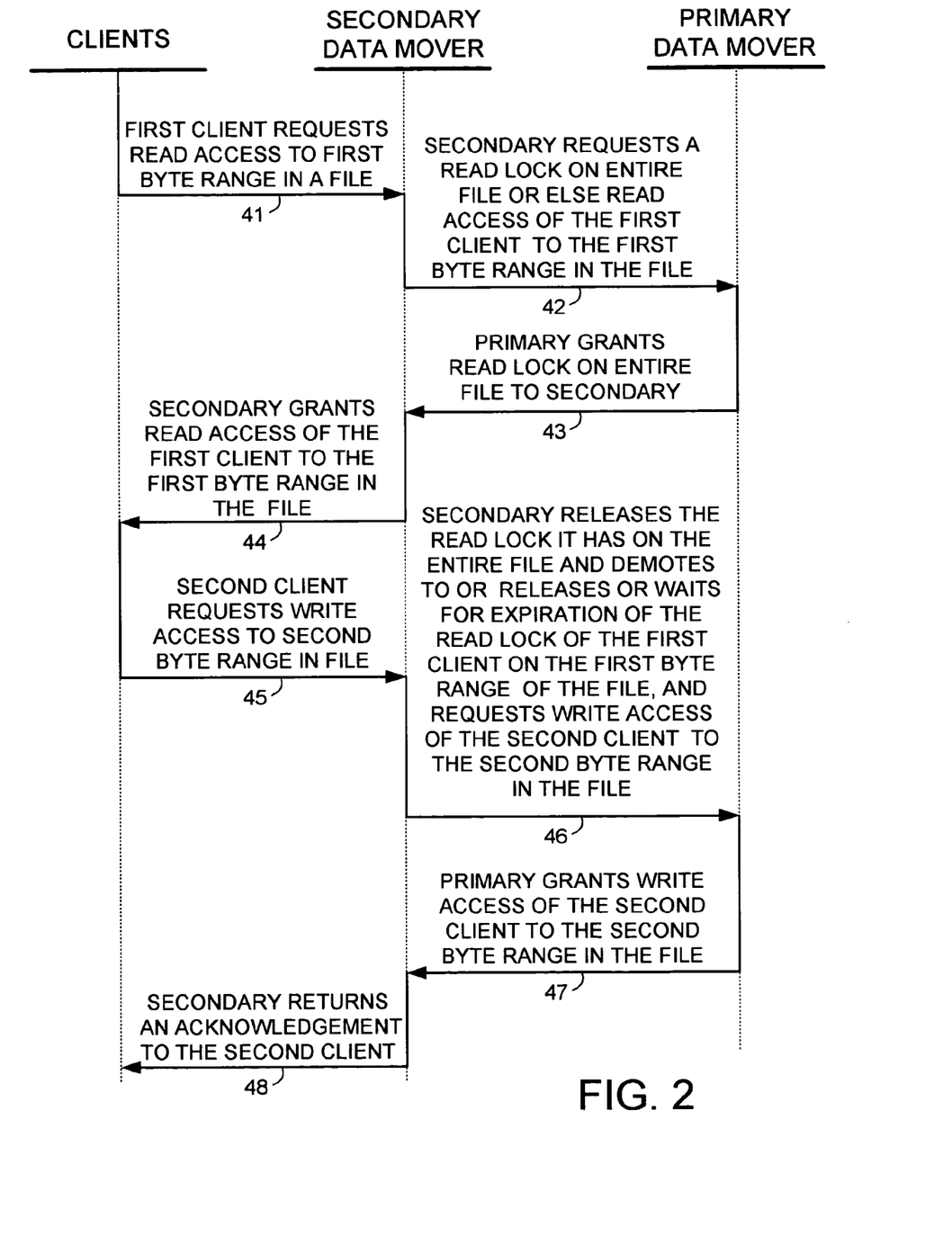
FIG. 2 is a flow diagram of messages between a client, a secondary data mover, and a primary data mover in a file access protocol in accordance with the invention.

FIG. 2 shows an example of a file access protocol between network clients, a secondary data mover, and a primary data mover, for allocating read and write file access tasks between the secondary data mover and the primary data mover. In a first step 41, a first client sends a request to the secondary data mover for access to a specific byte range in a file owned by the primary data mover. In step 42, the secondary data mover sends a request to the primary data mover for a read lock on the entire file or else read access of the first client to the specific byte range in the file. At this point of time in this example, there are no write locks on the file nor are there any pending requests for write locks on the file, so in step 43 the primary data mover returns to the secondary data mover a grant of a read lock upon the entire file. In step 44, upon receipt of the grant of the read lock upon the entire file, the secondary grants read access of the first client to at least the specific byte range in the file. When the secondary data mover has a lock upon an entire file, it can respond to further read access requests from other network clients by granting read access of the clients to byte ranges in the file without further requests or notifications to the primary data mover.

In step 45, a second client sends to the secondary data mover a request for write access to a specified byte range in the file. In response, in step 46, the secondary data mover releases any read lock it has on the entire file, and demotes to or releases or waits for the expiration of the read lock that the first client has on the specific byte range of the file. For example, if the specific byte range for the read lock of the first client conflicts with the specified byte range requested by the second client, then the secondary data mover waits for the release or expiration of the read lock of the first client on the file, and then requests the primary data mover to give to the second client write access to the specified byte range in the file. If there is no conflict between the specific byte range of the read lock of the first client and the specified byte range for the requested write access by the second client, then the secondary data mover can forward notification of a byte range read lock for the first client to the primary data mover together with the request for write access of the second client to the specified byte range of the file. In step 47, once there are no conflicts with the requested write access to the specified byte range in the file, the primary grants write access to the specified byte range in the file to the second client, and returns an acknowledgement to the secondary data mover. Finally, in step 46, the secondary data mover returns the acknowledgement to the second client.

The primary data mover and the secondary data mover may use various kinds of read and write file access control methods in the protocol of FIG. 2. For example, they may use conventional read and write lock managers of the kind that maintain a bit map of read and write lock flags for respective logical blocks of a file and pointers to lists of the client processes that own the outstanding locks. Preferably, however, the secondary data mover uses a file access control method that is especially suited for concurrent read access of clients to a file when the secondary data mover has a read lock on the entire file, and the primary data mover uses a file access control method that is especially sited to concurrent read and write byte range access to the file.

For example, when the secondary data mover has a read lock on an entire file, the secondary data mover may simply grant clients read locks that expire after a certain time interval, as described in Vahalia et al. U.S. Pat. No. 6,389,420 issued May 14, 2002, incorporated herein by reference. The primary data mover may use file access control methods described in Mullick et al, U.S. patent application Ser. No. 10/668,467 filed Sep. 23, 2003, entitled "Multi-threaded Write Interface and Methods for Increasing the Single File Read and Write Throughput," incorporated herein by reference. For example, as described in Mullick et al., a write operation includes obtaining a per file allocation mutex (mutually exclusive lock), preallocating a metadata block, releasing the allocation mutex, issuing an asynchronous write request for writing to the file, waiting for the asynchronous write request to complete, obtaining the allocation mutex, committing the preallocated metadata block, and then releasing the allocation mutex.

Figure 3:
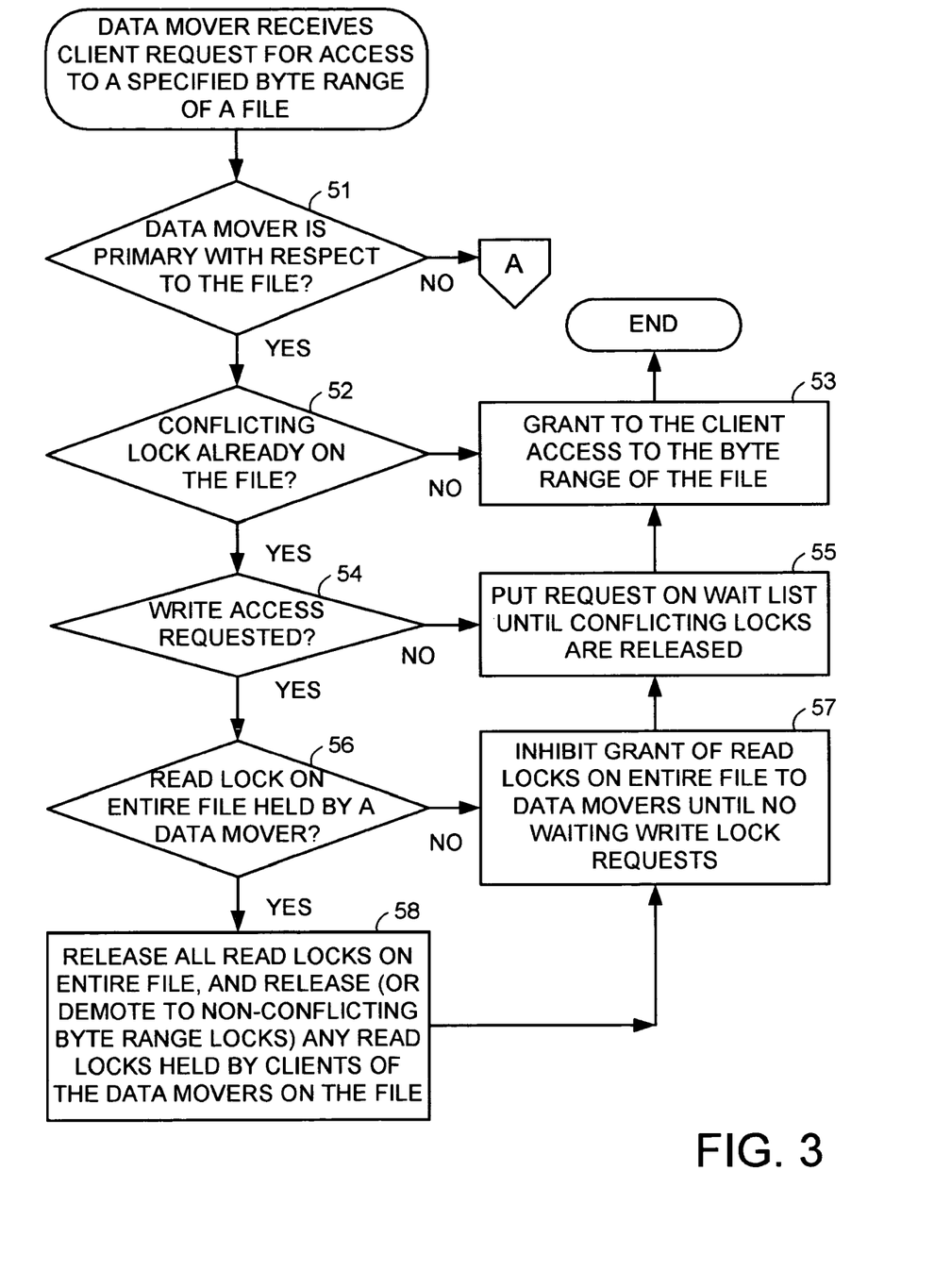
FIGS. 3 and 4 comprise a flowchart of programming in each data mover for managing a file access request in accordance with the protocol of FIG. 2.
Figure 4:
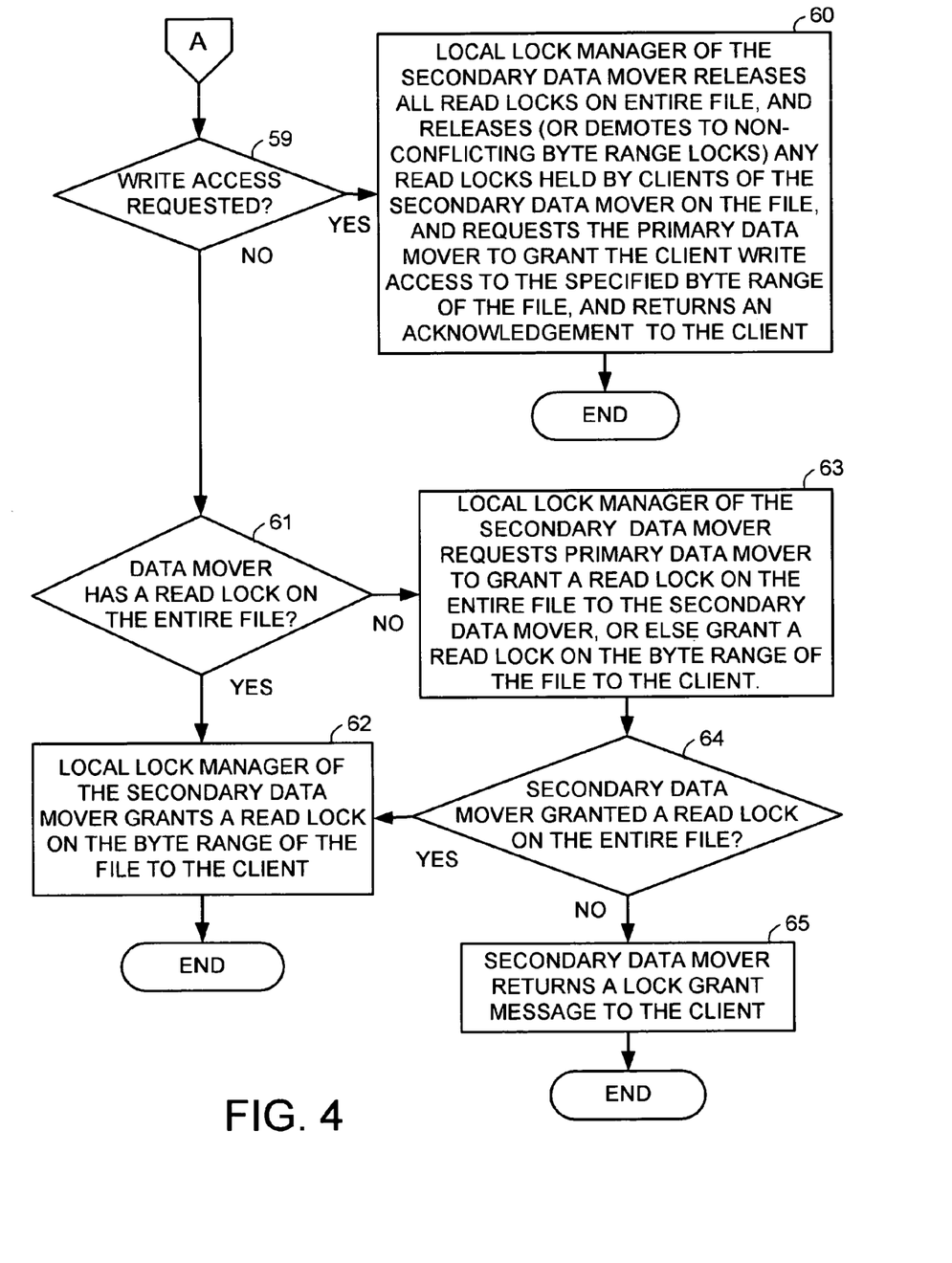

FIGS. 3 and 4 show an example of programming in each data mover for responding to a client request for read or write access to a specified byte range of a file in accordance with the protocol of FIG. 2. In step 51, execution continues to step 52 if the data mover is primary with respect to the file. In step 52, execution branches to step 53 if there is not a conflicting lock already on the file. In general, a desired write access to a specified byte range conflicts with an existing read lock or write lock on the entire file, or an existing read lock or write lock on a byte range that intersects with the specified byte range. In step 53, the primary data mover grants to the client access to the specified byte range of the file, and execution of the program is finished.

In step 52, if there is a conflicting lock already on the file, then execution continues to step 54. In step 54, if write access is not requested, then execution branches to step 55. In this case, the client's desired read access is waiting for completion of pending write access. In step 55, the read access request is placed on a wait list until all conflicting locks are released, at which time execution continues to step 53 to grant the client access to the specified byte range of the file.

In step 54, if write access is requested, then execution continues to step 56. In step 56, if a read lock on the entire file is not held by one or more data movers, then execution continues to step 57 to inhibit grant of read locks on the entire file to data movers until there are no waiting write lock requests. Then execution continues to step 55 to put the write access request on a wait list until all conflicting locks are released.

In step 56, if a read lock on the entire file is held by any of the data movers, then execution continues to step 58. In step 58, all of the read locks on the entire file are released, so that each data mover that had a lock on the entire file will no longer grant read access to its clients without again requesting access permission from the primary data mover. In addition, any read locks held by clients of each of these data movers are released (for example, execution waits in step 58 until they all expire), or else these read locks are demoted to non-conflicting byte range locks (which should be reported to and then managed by the primary data mover). Execution continues from step 58 to step 57.

In step 51, if the data mover is not primary with respect to the file, then execution branches to step 59 in FIG. 4. In step 59, if the client is requesting write access, then execution continues to step 60. In step 60, a local lock manager of the secondary data mover releases any read lock that the secondary data mover has on the entire file, and releases any read locks held by clients of the secondary data mover on the file (for example, execution waits in step 60 until these locks expire) or else demotes these client read locks to non-conflicting byte range locks (which should be reported to and then managed by the primary data mover). Also in step 60, the secondary data mover requests the primary data mover to grant the client write access to the specified byte range of the file, and returns an acknowledgement to the client. The primary data mover responds to this request for client write access as described above with respect to steps 52 to 58 of FIG. 3.

In step 59, if the client is not requesting write access, then execution continues to step 61. In step 61, if the secondary data mover has a read lock on the entire file, then execution continues to step 62. In step 62, the local lock manager of the secondary data mover grants a read lock on the byte range of the file to the client, and execution is finished.

In step 61, if the secondary data mover does not have a read lock on the entire file, then execution continues to step 63. In step 63, the local lock manager of the secondary data mover requests the primary data mover to grant a read lock on the entire file, or else to grant a read lock on the specified byte range to the client if a read lock on the entire file cannot be granted due to a pending write access to the file or a waiting request for write access to the file. Execution continues from step 63 to step 64. In step 64, execution branches to step 62 if the secondary data mover granted a read lock on the entire file. If in step 64 the secondary data mover did not grant a read lock on the entire file and instead granted a read lock on the specified byte range of the file to the client, then execution continues from step 64 to step 65. In step 65, the secondary data mover returns a lock grant message to the client, and execution is finished.

In view of the above, there has been described a protocol for allocating file access tasks between primary and secondary data mover computers in a network file server. When there is frequent read access and infrequent write access to a file, a primary data mover grants read locks to the entire file to secondary data movers, and the secondary data movers grant read locks to clients requesting read access. When write access to the file is needed, the read locks to the entire file are released and the read locks granted to the clients expire or are demoted to non-conflicting byte range locks managed by the primary data mover. Concurrent read and write access to the same file is then managed by the primary data mover.

What is claimed is:

1. In a network file server in which a plurality of data mover computers share access to storage and service file access requests from network clients, a method of sharing read access and write access to a file in the storage, a primary one of the data mover computers having primary responsibility for control of access to the file and a secondary one of the data mover computers having secondary responsibility for control of access to the file, said method comprising:

the secondary data mover computer receiving a request from a first network client for read access to the file;

the secondary data mover computer responding to the request from the first network client for said read access to the file by requesting a read lock on the entire file from the primary data mover computer;

the secondary data mover computer receiving from the primary data mover computer said read lock on the entire file;

the secondary data mover computer responding to the receipt of the read lock on the entire file by granting read access to the file to the first network client; and then the secondary data mover computer receiving a request from a second network client for write access to a specified byte range in the file;

the secondary data mover computer responding to receipt of the request from the second network client for write access to the specified byte range in the file by releasing the read lock on the entire file and sending to the primary data mover computer a request for write access of the client to the specified byte range in the file;

the secondary data mover computer receiving from the primary data mover computer an acknowledgement of a grant of write access of the client to the specified byte range in the file; and then the secondary data mover computer returning to the client the acknowledgement of the grant of write access of the client to the specified byte range in the file.

2. The method as claimed in claim 1, wherein the secondary data mover computer grants concurrent read locks on the file to a plurality of the network clients without notification to the primary data mover computer when the secondary data mover computer holds the read lock on the entire file from the primary data mover computer.

3. The method as claimed in claim 1, wherein a third network client requests read access to a specific byte range in the file when the secondary data mover computer does not have a read lock on the entire file and the secondary data mover computer then forwards to the primary data mover computer the request of the third network client for read access to the specific byte range of the file, and the primary data mover computer grants the third network client read access to the specific byte range of the file upon determining that a conflict precludes a grant of a read lock on the entire file to the secondary data mover computer but the conflict does not preclude a grant of read access for the third network client to the specific byte range in the file.

4. The method as claimed in claim 1, wherein the secondary data mover computer grants read access to the first network client for a certain period of time, and waits for expiration of the certain period of time upon receipt of the request from the second network client for write access to the specified byte range in the file before sending to the primary data mover computer the request for write access of the client to the specified byte range in the file.

5. The method as claimed in claim 1, wherein the first network client requests read access to a specific byte range in the file, and upon receipt of the request from the second network client for write access to a specified byte range in the file, the secondary data mover computer checks whether read access to the specific byte range in the file conflicts with write access to the specified byte range in the file, and upon finding that read access to the specific byte range in the file does not conflict with write access to the specified byte range in the file, notifies the primary data mover computer of the grant of read access of the first network client to the specific byte range in the file.

6. In a network file server in which a plurality of data mover computers share access to storage and service file access requests from network clients, a method of sharing read access and write access to a file in the storage, a primary one of the data mover computers having primary responsibility for control of access to the file and a secondary one of the data mover computers having secondary responsibility for control of access to the file, said method comprising:

the secondary data mover computer holding a read lock on the entire file, and while holding the read lock on the entire file, the secondary data mover computer granting concurrent client read access to the file without notification to the primary data mover computer; and in response to a request from a client for write access to a specified byte range of the file, the secondary data mover computer releasing the read lock on the entire file, and upon termination of the concurrent client read access to the file without notification to the primary data mover computer, the secondary data mover computer notifying the primary data mover computer of the release of the read lock on the entire file, and in response to the notification of the release of the read lock on the entire file, the primary data mover computer granting the client write access to the specified byte range of the file, and concurrent with the write access to the specified byte range of the file, the primary data mover computer granting to at least some of the network clients read access to specific byte ranges of the file.

7. The method as claimed in claim 6, wherein the secondary data mover computer grants the concurrent client read access to the file without notification to the primary data mover computer by granting to each of a plurality of the network clients a certain period of time to complete read access, and wherein the secondary data mover computer waits for expiration of the certain period of time before notifying the primary data mover computer of the release of the read lock on the entire file.

8. The method as claimed in claim 6, wherein the secondary data mover computer checks whether concurrent client read access by at least one of the network clients to one of the specific byte ranges of the file conflicts with the write access to the specified byte range in the file, and upon finding that read access to said one of the specific byte ranges in the file does not conflict with write access to the specified byte range in the file, notifies the primary data mover computer of the grant of the concurrent client read access by said at least one of the network clients to said one of the specific byte ranges in the file.

9. A network file server comprising storage and a plurality of data mover computers coupled to the storage for sharing access to the storage, the data mover computers being programmed to service file access requests from network clients, wherein a primary one of the data mover computers is programmed to have primary responsibility for control of access to a file in the storage, and a secondary one of the data mover computers being programmed to have secondary responsibility for control of access to the file, wherein the secondary data mover computer is programmed for holding a read lock on the entire file, and while holding the read lock on the entire file, granting concurrent read access to the file to a plurality of the network clients without notification to the primary data mover computer; and wherein the secondary data mover computer is programmed to respond to a request from a client for write access to a specified byte range of the file by releasing the read lock on the entire file, and upon termination of the concurrent read access to the file to the plurality of the network clients without notification to the primary data mover computer, notifying the primary data mover computer of the release of the read lock on the entire file; and wherein the primary data mover computer is programmed to respond to the notification of the release of the read lock on the entire file by granting the client write access to the specified byte range of the file, and concurrent with the write access to the specified byte range of the file, granting to at least some of the network clients read access to specific byte ranges of the file.

10. The network file server as claimed in claim 9, wherein the secondary data mover computer is programmed to grant the concurrent read access to the file to the plurality of the network clients without notification to the primary data mover computer by granting to each of the plurality of the network clients a certain period of time to complete the concurrent read access, and wherein the secondary data mover computer is programmed to wait for completion of the certain period of time before notifying the primary data mover computer of the release of the read lock on the entire file.

11. The network file server as claimed in claim 9, wherein the secondary data mover computer is programmed to check whether read access by at least one of the plurality of the clients to one of the specific byte ranges of the file conflicts with the write access to the specified byte range in the file, and upon finding that read access to said one of the specific byte ranges in the file does not conflict with write access to the specified byte range in the file, notifying the primary data mover computer of the grant of the read access by said at least one of the plurality of the clients to said one of the specific byte ranges in the file.

12. A network file server comprising storage and a plurality of data mover computers coupled to the storage to share access to storage, the data mover computers being programmed to service file access requests from network clients, wherein a primary one of the data mover computers is programmed to have primary responsibility for control of access to a file in the storage, and a secondary one of the data mover computers being programmed to have secondary responsibility for control of access to the file, wherein the primary data mover computer is programmed to respond to a client request for access to a specified byte range of the file by checking whether access to the specified byte range of the file by the client does not conflict with a lock already on the file, and upon finding that access to the specified byte range of the file does not conflict with said lock already on the file, granting to the client access to the specified byte range of the file, and upon finding that access to the specified byte range of the file does conflict with said lock already on the file, placing the request on a wait list until the conflicting lock is released, and upon finding that the client is requesting write access to the file, checking whether the secondary data mover computer holds a read lock on the entire file, and upon finding that the secondary data mover computer holds said read lock on the entire file, requesting the secondary data mover computer to release said read lock on the entire file, and wherein the secondary data mover computer is programmed to respond to client requests for read access to the file by obtaining from the primary data mover computer said read lock on the entire file, and upon obtaining said read lock on the entire file from the primary data move computer, granting concurrent client read access to the file, and upon receiving a request from the primary data mover computer for release of said read lock on the entire file, the secondary data mover computer releasing said read lock on the entire file and notifying the primary data mover computer of release of said read lock on the entire file.

13. The network file server as claimed in claim 12, wherein the secondary data mover computer is programmed to respond to a request for write access to the file by releasing the read lock on the entire file and notifying the primary data mover computer of the request for write access to the file.

14. The network file server as claimed in claim 13, wherein the secondary data mover computer is further programmed to respond to the request for write access to the file by checking whether the concurrent client read access to the file conflicts with the requested write access to the file, and upon finding that the concurrent client read access to the file conflicts with the requested write access to the file, terminating the conflicting concurrent read access to the file without notifying the primary data mover of the conflicting concurrent read access to the file.

15. The network file server as claimed in claim 13, wherein the secondary data mover computer is further programmed to respond to the request for write access to the file by checking whether the concurrent client read access to the file conflicts with the requested write access to the file, and upon finding that the concurrent client read access to the file does not conflict with the requested write access to the file, notifying the primary data mover computer of the non-conflicting concurrent read access to the file.

* * * * *

UNITED STATES PATENT AND TRADEMARK OFFICE
CERTIFICATE OF CORRECTION

PATENT NO. : 7,315,926 B2 Page 1 of 1
APPLICATION NO. : 10/945654
DATED : January 1, 2008
INVENTOR(S) : Fridella et al.

It is certified that error appears in the above-identified patent and that said Letters Patent is hereby corrected as shown below:

In Claim 12, Col. 11, line 21, --the-- is inserted before "release".

Signed and Sealed this

Twentieth Day of May, 2008

JON W. DUDAS
*Director of the United States Patent and Trademark Office*